US012781119B2

(12) United States Patent
Lafitte et al.

(10) Patent No.: US 12,781,119 B2
(45) Date of Patent: Nov. 3, 2026

(54) FUNCTIONALIZED NANOPARTICLES AS WETABILITY MODIFIER

(71) Applicant: Schlumberger Technology Corporation, Sugar Land, TX (US)

(72) Inventors: Valerie Gisele Helene Lafitte, Sugar Land, TX (US); Juan David Estrada Benavides, Katy, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 0 days.

(21) Appl. No.: 19/342,222

(22) Filed: Sep. 26, 2025

(65) Prior Publication Data

US 2026/0022291 A1 Jan. 22, 2026

Related U.S. Application Data

(63) Continuation of application No. 18/716,058, filed as application No. PCT/US2022/053441 on Dec. 20, 2022, now Pat. No. 12,428,592.

(60) Provisional application No. 63/266,125, filed on Dec. 29, 2021.

(51) Int. Cl.
*C09K 8/90* (2006.01)
*E21B 43/26* (2006.01)

(52) U.S. Cl.
CPC ................ *C09K 8/90* (2013.01); *E21B 43/26* (2013.01); *C09K 2208/08* (2013.01); *C09K 2208/10* (2013.01)

(58) Field of Classification Search
None
See application file for complete search history.

(56) References Cited

U.S. PATENT DOCUMENTS

2005/0164894 A1* 7/2005 Eoff ....................... C09K 8/514 507/200
2006/0065396 A1* 3/2006 Dawson ................... C09K 8/52 166/305.1
2014/0087974 A1* 3/2014 Villarreal ............ C04B 20/1011 166/305.1
2016/0168443 A1* 6/2016 Lafitte ................. C04B 20/1029 507/112

* cited by examiner

*Primary Examiner* — Andrew Sue-Ako
(74) *Attorney, Agent, or Firm* — Jeffrey D. Frantz

(57) ABSTRACT

A method of stimulating a subterranean formation includes preparing an aqueous dispersion including one or more cellulosic nanoparticles. The cellulosic nanoparticles have respective surfaces functionalized with one or more hydrophilic polymers or ligands, one or more hydrophobic polymers or ligands, or a combination thereof. The method also includes pumping the aqueous dispersion into the subterranean formation.

7 Claims, No Drawings

FUNCTIONALIZED NANOPARTICLES AS WETABILITY MODIFIER

CROSS-REFERENCE TO RELATED APPLICATION

This patent application is continuation of U.S. patent application Ser. No. 18/716,058, filed Jun. 3, 2024, which is a National Stage Entry of PCT Patent Application No. PCT/US2022/053441, filed Dec. 20, 2022, which claims benefit of U.S. Provisional Patent Application No. 63/266,125, filed Dec. 29, 2021, all of which are entirely incorporated herein by reference.

FIELD

This patent application describes methods and apparatus for stimulating hydrocarbon reservoirs. Specifically, methods and materials for changing flow characteristics within hydrocarbon reservoirs are described.

BACKGROUND

Wells are commonly drilled into hydrocarbon formations to recover valuable hydrocarbon deposits. These hydrocarbon deposits are made to flow from the formation into the well and up to the surface. Natural flow channels within the reservoir that enable hydrocarbons to flow into a well can be limited by factors such as rock porosity and permeability, and by size and nature of fissures in the formation. Movement of water can also diminish hydrocarbon producibility. Water can move into flow pathways and into the producing well, replacing flow of hydrocarbon, and water can block hydrocarbon flow pathways, reducing overall production from the well.

Water is also sometimes used to stimulate movement of hydrocarbon from the reservoir into the well. Water is injected into target locations of the reservoir to displace hydrocarbon toward the well. Water flows through the reservoir along the path of least resistance, which may bypass some hydrocarbon deposits due to non-uniformity of reservoir characteristics. The bypassed hydrocarbon remains inaccessible by water stimulation.

Numerous treatments exist to reduce the deleterious effect of water on hydrocarbon production. Existing treatments use various combinations of polymers, gels, solutions, solids, acids, salts, and the like, to influence evolution of flow properties within the reservoir.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one embodiment, a method of stimulating a subterranean formation includes preparing an aqueous dispersion including one or more cellulosic nanoparticles. The cellulosic nanoparticles have respective surfaces functionalized with one or more hydrophilic ligands, one or more hydrophobic ligands, or both. The method also includes pumping the aqueous dispersion into the subterranean formation.

In another embodiment, a method of stimulating a subterranean formation includes preparing an aqueous dispersion including one or more cellulosic nanoparticles. The cellulosic nanoparticles have respective surfaces functionalized with one or more polymeric ligands. The method also includes pumping the aqueous dispersion into the subterranean formation.

In yet another embodiment, a method of stimulating a subterranean formation includes preparing an aqueous dispersion including one or more cellulosic nanoparticles. The cellulosic nanoparticles have respective surfaces functionalized with one or more hydrophilic polymers, one or more hydrophobic polymers, or both. The method also includes pumping the aqueous dispersion into the subterranean formation.

Various embodiments of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The following definitions are provided in order to aid those skilled in the art in understanding the detailed description.

As used herein, the term "treatment fluid" refers to any pumpable and/or flowable fluid used in a subterranean operation in conjunction with a desired function and/or for a desired purpose. In some examples, the pumpable and/or flowable treatment fluid may have any suitable viscosity, such as a viscosity of from about 1 cP to about 10,000 cP (0.001 to 10 Pa*s), such as from about 10 cP to about 1000 cP (0.01 to 1 Pa*s), or from about 10 cP to about 100 cP (0.01 to 0.1 Pa*s), at the treating temperature, which may range from a surface temperature to a bottom-hole static (reservoir) temperature, such as from about 0° C. to about 200° C., or from about 10° C. to about 120° C., or from about 25° C. to about 100° C., and a shear rate (for the definition of shear rate reference is made to, for example, Introduction to Rheology, Barnes, H.; Hutton, J. F; Walters, K. Elsevier, 1989, the entire contents of which are hereby incorporated by reference here) in a range of from about 1 s-1 to about 1000 s-1, such as a shear rate in arrange of from about 100 s-1 to about 1000 s-1, or a shear rate in a range of from about 50 s-1 to about 500 s-1 as measured by common methods, such as those described in textbooks on rheology, including, for example, Rheology: Principles, Measurements and Applications, Macosko, C. W., VCH Publishers, Inc. 1994, the entire contents of which are hereby incorporated by reference here.

The term "particulate" or "particle" refers to a solid 3D object with maximal dimension significantly less than 1 meter. Here "dimension" of the object refers to the distance between two arbitrary parallel planes, each plane touching the surface of the object at at least one point. The maximal dimension refers to the biggest distance existing for the object between any two parallel planes and the minimal dimension refers to the smallest distance existing for the object between any two parallel planes.

Hydrocarbons (such as oil, condensate, and gas) may be produced from wells that are drilled into subterranean formations containing them. For a variety of reasons, such as low permeability of the reservoirs or damage to the formation caused by drilling and completion of the well, or other reasons resulting in low conductivity of the hydrocarbons to the well, the flow of hydrocarbons into the well may be undesirably low. In this case, the well is "stimulated," for example, using hydraulic fracturing, chemical (such as an acid) stimulation, or a combination of the two (often referred to as acid fracturing or fracture acidizing).

Nanoparticles functionalized with hydrophilic and hydrophobic ligands are described herein for use in altering flow properties of hydrocarbon reservoirs (e.g., subterranean formations) to enhance hydrocarbon production from such reservoirs. The nanoparticles are transported in an aqueous fluid (e.g., a treatment fluid) and placed in the reservoir by pumping from the surface through a well drilled into the reservoir. The functionalized nanoparticles interact with materials in the reservoir in targeted ways to enhance relative permeability of oil versus water in the reservoir.

The nanoparticles are based on an organic material such as nanocellulose, cellulose nanocrystals, nanofibrillated cellulose, or cellulose microfiber, any of which may be lyophilized. The nanoparticles can have dimensions ranging from 10 nm to 1,000 nm (1 μm) and may be substantially spherical, spheroidal, elongated, oval, needle-like, ribbon-like, or fibrous. Polymeric ligands are attached to the surface of the nanoparticles through chemical bonding. The polymeric ligands can have hydrophilic and hydrophobic portions, or a mixture of hydrophilic and hydrophobic ligands can be attached to the surface of the nanoparticles. The hydrophilic and hydrophobic moieties influence how the nanoparticles interact with charged, or charge-responsive, materials in the reservoir. Most geologic materials, such as rock and sand, have oxygen chemically incorporated into the material, and that oxygen can provide an electrostatic adhesion site or chemical bonding site to attach a selected molecule. Ultimately, the nanoparticles penetrate microfissures within the reservoir and the ligands bonded to the nanoparticles bond or adhere to rock surfaces so that the nanoparticles change flow characteristics within the reservoir.

Cellulosic particles, such as nanocellulose particles or microcellulose particles, can be functionalized with hydrophilic polymers, hydrophobic polymers, or hydrophilic-hydrophobic copolymers. Low molecular weight oligomer versions of each can also be used. Hydrophilic moieties can provide affinity for oxygen-containing geologic materials that form the walls or boundaries of flow pathways within a reservoir. Hydrophobic moieties can provide affinity of the bonded nanoparticles for oleaginous species, such as hydrocarbons. Decorating nanoparticles with hydrophilic and hydrophobic ligands can provide a way to "lubricate" passages within the reservoir to enhance flow of oleaginous species, and can provide a way to block movement of water by collecting nanoparticles at water fronts within the reservoir. The relative weight or percentage of hydrophilic and hydrophobic species attached to the nanoparticles can influence their behavior within the reservoir.

Cellulosic particles have numerous hydroxide groups exposed at the surface thereof that provide reactive sites for functionalization through reactions of polymer molecules, or linking groups, with the hydroxide groups. Cellulosic particles can react with functional acid end groups attached to molecules of all types to add functionalities to the surface of the particles via the surface hydroxide groups. In this case, polymer molecules are attached to the surface of cellulosic particles by chemical bonding. The polymer is made in a separate reaction, and the cellulosic nanoparticles are added to the polymer mixture to achieve functionalized nanoparticles. In certain embodiments, the cellulosic nanoparticles may include nanocellulose, rod-like nanoparticles, nanotubes, halloysite, or combinations thereof.

The polymers generally have hydrophilic and hydrophobic components. In this application, the terms "hydrophilic" and "hydrophobic" are generally defined based on water contact angle (e.g. ASTM D7490-13). A material is generally "hydrophilic" if the water contact angle is less than 900 and "hydrophobic" if the water contact angle is greater than 90°. Herein, surface morphology effects, where a given material can be made hydrophilic or hydrophobic by modifying the surface structure of the material at the nano-scale, are not incorporated in use of the terms.

In one embodiment, a copolymer having hydrophilic and hydrophobic components is formed, and the copolymer molecules are attached to the nanoparticles. In another embodiment, a first polymer having hydrophilic components is attached to the nanoparticles, and a second polymer having hydrophobic components is attached to the nanoparticles. In a third embodiment, a first polymer having hydrophilic components and hydrophobic components is attached to the nanoparticles, a second polymer is attached to the nanoparticles, and a third polymer is attached to the nanoparticles, where the second polymer is hydrophilic and the third polymer is hydrophobic. Mixtures of different polymers and copolymers having different degrees of hydrophilicity and hydrophobicity can be attached to cellulosic nanoparticles to yield functionalized nanoparticles having targeted water-phase and oil-phase behavior.

In one embodiment, a polyacrylamide (PAM) polymer (e.g., $C_5$-$C_{30}$) is used as a hydrophilic polymer. The polyacrylamide polymer, specifically poly(2-propenamide), can be copolymerized with a hydrophobic polymer or oligomer. Alternately, the polyacrylamide polymer can be attached to the cellulosic nanoparticle, and a separate hydrophobic polymer or oligomer can be attached to the cellulosic nanoparticle. Thus, for example, a polyacrylamide polymer can be provided in aqueous solution, and cellulosic nanoparticles added to the solution. At pH above 7.0, the polyacrylamide polymer chains attach to the cellulosic nanoparticles. To attach other moieties to other attachment sites of the cellulosic nanoparticles, stoichiometry of the solution is targeted such that some reactive sites of the cellulosic nanoparticles remain unoccupied by PAM ligands. The nanoparticles with PAM ligands can be removed from solution, or the polymer in solution can be exhausted by reaction to stop attachment of PAM to the nanoparticles. Subsequently, the nanoparticles can be exposed to a hydrophobic polymer to attach hydrophobic polymer chains to unoccupied sites of the nanoparticles.

Hydrophobic polymers can be attached to the surface of cellulosic particles by activating the surface hydroxide groups of the cellulosic particles. The surface hydroxide groups can be oxidized to carboxylic acid groups by treatment with a selected oxidant, for example sodium hypochlorite or sodium chlorite with 2,2,6,6-tetramethylpiperidinyloxyl chloride, or sodium metaperiodate. Acid-reactive species, polymers or oligomers, with targeted hydro-affinity can then be attached to the acid groups. For example, long-chain primary alcohols can be attached to the acid groups, forming ester linkages to hydrocarbyl ligands, which are hydrophobic. Other hydrophobic ligands can be attached in similar ways. Hydrophilic ligands having hydroxyl groups can also be attached using surface acid groups. For example, polyalkylene oxide ligands, acrylate ligands, PAM ligands, and other acid-reactive hydrophilic species, can be attached using terminal hydroxyl groups, amine groups, or other acid-reactive groups. To make di-functionalized cellulose nanoparticles, polyacrylamide polymer can be added to a first portion of surface sites of cellulose particles in alkaline solution using stoichiometrically deficient PAM, as described above. The reaction can be sustained to completion, or the functionalized intermediate particles can be removed from the mixture and re-deployed in alkaline solution. An acrylic or acrylate polymer, such as PMA, PMMA, or PAA, is added to the alkaline solution containing the PAM-modified cellulosic nanoparticles, and acid groups are then encouraged to functionalize remaining reactive sites of the cellulose to initiate attachment of the acrylate polymer. The acrylate polymer can be hydrophilic or hydrophobic, depending on side chains. For example, poly n-butyl methacrylate has been shown to have a water contact angle of 91°, and poly t-butyl methacrylate is even more hydrophobic, while polymers such as PMA, PMMA, and PAA are hydrophilic. Longer hydrocarbyl side chains tend to make acrylic polymers more hydrophobic.

Other methods of adding surface functionalization to cellulose nanoparticles are known. Direct esterification by simple reaction with acetic acid or acetic anhydride in non-swelling solvent produces acetate surface groups that can be trans-esterified. Other organic and inorganic acids and anhydrides can also be used. For example, sulfation and phosphorylation are common. Direct nucleophilic substitution, for example using thionyl chloride in pyridine, can substitute halogens for hydroxyl groups. The halogen can then be used as a leaving group to attach hydrophilic and/or hydrophobic ligands. Etherification, amidation (from acid-functionalized cellulosic particles), carbamation, and silylation of cellulosic particles are also known processes. In another embodiment, quaternary ammonium groups may be functionalized with hydrophilic polymer chains.

In this way, cellulosic nanoparticles di-functionalized with hydrophilic and hydrophobic polymers can be obtained. In other embodiments, cellulosic nanoparticles can be decorated only with ligands that have hydrophilic and hydrophobic portions. A copolymer of hydrophilic and hydrophobic chains is formed in a solution. For example, acrylamide can be polymerized with a hydrophobic acrylic polymer or oligomer, such as poly t-butyl methacrylate, or similar polymers and oligomers. To avoid excessive molecular weight growth in the copolymer, the acrylic polymer or oligomer may be in substantial molar deficit, for example 10% or less molar equivalence, or the acrylic polymer or oligomer may have low molecular weight, for example 1000 Daltons or less. If the acrylamide monomer (specifically 2-propenamide) is in substantial molar excess, the copolymer formed is a hydrophilic polyacrylamide chain with hydrophobic polyacrylic side chains. In another embodiment, hydrophobic acrylic polymers or oligomers can be copolymerized with PAM polymer or oligomer molecules in a similar way to form a hydrophobic polyacrylic chain with hydrophilic PAM side chains. In yet another embodiment, a copolymer of low molecular weight PAM and hydrophobic polyacrylic oligomers can be formed that results in a mixed polymer chain with no clear electrostatic property but with side chains that are hydrophilic and hydrophobic. Such a polymer can form hydrophilic and hydrophobic domains by association of like side chains. These polymers can all be attached to cellulosic nanoparticles by processes set forth above.

The hydrophilic species may include PAM, as described above, but may also include polymers and oligomers such as polyethylene glycol (PEG), polyethylene imine (PEI), polyvinyl pyrrolidone (PVP), polyethylene oxide (PEO), lower acrylic polymers such as polyacrylic acid and polyacrylic polymers with small hydrocarbyl side chains, and other known hydrophilic polymers. It should be noted that hydrophilicity can be relative. In some embodiments, polyacrylic polymers may provide a hydrophilic species where, for example, the polyacrylic polymer is copolymerized with a linear alpha olefin (LAO) species, such as a $C_{10}$-$C_{20}$ LAO, or a mixture thereof. In such cases, oxygen in the polyacrylic polymer makes the polyacrylic moiety more hydrophilic than the alkyl chain of the LAO species. Likewise, as above, where a polyacrylic species is copolymerized with a more hydrophilic species, the polyacrylic species can be relatively hydrophobic. The resulting species can be, overall, hydrophilic or hydrophobic in bulk, with portions of each molecule having different hydro-affinity. Polymers and oligomers can be selected based on their relative hydrophilicity, and can be included according to a selected ratio to tailor properties of the ligands attached to the cellulosic nanoparticles. Terpolymers and multipolymers of any of the species described above having different hydrophilicities can also be attached to cellulosic nanoparticles.

It should also be noted that one nanoparticle can be decorated with more than one type of copolymer, terpolymer, and/or multipolymer. For example, a first plurality of nanoparticles can be decorated with a first copolymer, terpolymer, or multipolymer having a first charge characteristic and a second plurality of nanoparticles can be decorated with a second copolymer, terpolymer, or multipolymer having a second charge characteristic. The two decorated nanoparticles can be used in a mixture for reservoir treatment, or can be delivered separately to accomplish a treatment objective. Instead of, or in addition to, one of the copolymers, terpolymers, or multipolymers, one or more homopolymer ligands can be attached to the nanoparticle, such that the nanoparticle is decorated with a mixture of homopolymers, copolymers, terpolymers, and/or multipolymers.

In some embodiments, Janus particles can be created by masking one side of the cellulose nanoparticles, attaching a first ligand, unmasking the particles, and then attaching a second ligand. This can create cellulose nanoparticles having hydrophilic ligands on one side and hydrophobic ligands on the other side.

The ligands attached to the cellulosic nanoparticles can be charge enhanced. For example, a polyacrylamide polymer can be ammoniated by reaction with a monoamine in a suitable co-solvent such as ethylene glycol. The polymer can be isolated and then attached to cellulosic nanoparticles as described above. Attaching cationic polymers to the cellulosic nanoparticles can enhance the hydrophilicity of the attached ligands.

The cellulosic nanoparticles employed herein have sizes that range from about 10 nm to about 1,000 nm, as stated above. Cellulosic materials, such as wood chips and fibers, can be ground in a mill under an inert or non-reactive atmosphere, or cellulosic materials can be chemically manufactured using cellulosic materials as raw materials or from bacterial metabolism. The type of cellulosic material can be chosen for density of reactive OH groups at the surface of the particles.

The cellulosic nanoparticles, with selected ligands attached in selected quantities, are recovered, and may be washed before deployment in a well. To transport the functionalized nanoparticles down hole, the nanoparticles are dispersed in an aqueous medium, such as water or brine. Dispersants such as surfactants can be used to enhance dispersion of the nanoparticles in the medium. Other additives such as diverter materials and viscosifiers can be added to enhance performance within the reservoir or to enhance transportability of the mixture.

The specific embodiments described above have been illustrated by way of example and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

We claim:

1. A method of stimulating a subterranean formation, the method comprising:

preparing an aqueous dispersion of one or more cellulosic nanoparticles, wherein respective surfaces of the one or more cellulosic nanoparticles are functionalized with one or more hydrophilic-hydrophobic co-polymers, wherein one or more hydrophilic polymers of the one or more hydrophilic-hydrophobic co-polymers comprise a cationic polymer, and wherein the cationic polymer is an ammoniated polyacrylamide (PAM) polymer; and pumping the aqueous dispersion into the subterranean formation.

2. The method of claim 1, wherein the one or more cellulosic nanoparticles of the aqueous dispersion are configured to adhere to one or more surfaces associated with a passage within the subterranean formation to change one or more flow characteristics associated with the passage.

3. The method of claim 1, wherein the aqueous dispersion comprises a surfactant.

4. The method of claim 1, wherein the aqueous dispersion comprises a diverter material.

5. The method of claim 1, wherein the aqueous dispersion comprises a viscosifier.

6. The method of claim 1, wherein the one or more cellulosic nanoparticles comprise nanocellulose, nanotubes, cellulose nanocrystals, nanofibrillated cellulose, or cellulose microfiber, or a combination thereof.

7. The method of claim 1, wherein one or more hydrophobic polymers of the one or more hydrophilic-hydrophobic co-polymers comprise one or more acrylate polymers.

* * * * *